(12) United States Patent
Abramson et al.

(10) Patent No.: US 8,160,585 B2
(45) Date of Patent: Apr. 17, 2012

(54) CALL-HANDLING FOR AN OFF-PREMISES, TELECOMMUNICATIONS TERMINAL WITH AN INSTALLED SUBSCRIBER IDENTITY MODULE

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/269,189

(22) Filed: Oct. 7, 2011

(65) Prior Publication Data

US 2012/0046031 A1  Feb. 23, 2012

Related U.S. Application Data

(62) Division of application No. 12/019,290, filed on Jan. 24, 2008, now Pat. No. 8,036,660.

(51) Int. Cl.
*H04W 8/20* (2009.01)
*H04W 60/00* (2009.01)

(52) U.S. Cl. ............... 455/435.1; 455/432.1; 455/456.1; 455/551; 455/552.1

(58) Field of Classification Search .................. None
See application file for complete search history.

(56) References Cited

U.S. PATENT DOCUMENTS

| | | |
|---|---|---|
| 2004/0142689 A1 | 7/2004 | Boda |
| 2005/0020308 A1 | 1/2005 | Lai |
| 2005/0130654 A1 | 6/2005 | Di Claudio et al. |
| 2005/0153741 A1 | 7/2005 | Chen et al. |
| 2007/0156804 A1 | 7/2007 | Mo |
| 2008/0161050 A1 | 7/2008 | Shudark et al. |

FOREIGN PATENT DOCUMENTS

WO  WO 2006087720 A1  8/2006

OTHER PUBLICATIONS

Extended Search Report, European Patent Application No. 08172816.4, Jun. 2, 2009, 7 pages.

*Primary Examiner* — Philip Sobutka
(74) *Attorney, Agent, or Firm* — Maldjian Law Group LLC; John P. Maldjian, Esq.; Alexander D. Walter, Esq.

(57) ABSTRACT

Apparatus and method are disclosed that enable an organization's enterprise-wide network to accommodate roaming wireless terminals that are affiliated with the local enterprise networks within the enterprise-wide network. An embodiment of a system is capable of handling a wireless terminal, such as a cellular telephone, that is able to use different SIM cards in different geographic regions or service-provider networks. A mobility client that is part of the wireless terminal registers when it detects that a new SIM card has been installed at the wireless terminal, whereby the client provides the subscriber-specific information that the wireless terminal reads from the SIM card. The mobility client identifies itself to the server by a user identifier, such as the station extension with which the terminal is affiliated back at the home local enterprise network. Upon successful registration, the client receives an access number suitable for its current location.

7 Claims, 11 Drawing Sheets

| Location | Mobile Carrier Code | Mobile Network Code | 610 |
|---|---|---|---|
| Germany | 262 | 01 | |
| Luxembourg | 270 | 99 | |
| ⋮ | ⋮ | ⋮ | |
| Switzerland | 228 | 03 | |

| Location | PBX Gateway | Access Number | 620 |
|---|---|---|---|
| Germany | pbx.de.company.com | 496997464125 | |
| Luxembourg | pbx.de.company.com | 3524282820 | |
| ⋮ | ⋮ | ⋮ | |
| Switzerland | pbx.ch.company.com | 410717875030 | |

| Extension | Home Cell Number | Home Location | Visiting Cell Number | Current Location | 630 |
|---|---|---|---|---|---|
| 64023 | 1632829515 | Germany | | | |
| 82180 | 621241856 | Luxembourg | | | |
| 75207 | 786591013 | Switzerland | | | |
| ⋮ | ⋮ | ⋮ | ⋮ | ⋮ | |
| 64057 | 1632829282 | Germany | 41794450578 | Switzerland | |

| PBX On-Premises Station Extension | Off-Premises Telephone Number |
|---|---|
| +1-732-555-0102 x11 | +1-201-555-1236 |
| +1-732-555-0102 x12 | +1-908-555-3381 |
| ⋮ | ⋮ |
| +1-732-555-0102 x99 | +1-212-555-6784 |

| Location | Mobile Carrier Code | Mobile Network Code | |
|---|---|---|---|
| Germany | 262 | 01 | 610 |
| Luxembourg | 270 | 99 | |
| ... | ... | ... | |
| Switzerland | 228 | 03 | |

| Location | PBX Gateway | Access Number | |
|---|---|---|---|
| Germany | pbx.de.company.com | 496997464125 | 620 |
| Luxembourg | pbx.de.company.com | 3524282820 | |
| ... | ... | ... | |
| Switzerland | pbx.ch.company.com | 410717875030 | |

| Extension | Home Cell Number | Home Location | Visiting Cell Number | Current Location | |
|---|---|---|---|---|---|
| 64023 | 1632829515 | Germany | | | 630 |
| 82180 | 621241856 | Luxembourg | | | |
| 75207 | 786591013 | Switzerland | | | |
| ... | ... | ... | ... | ... | |
| 64057 | 1632829282 | Germany | 41794450578 | Switzerland | |

CALL-HANDLING FOR AN OFF-PREMISES, TELECOMMUNICATIONS TERMINAL WITH AN INSTALLED SUBSCRIBER IDENTITY MODULE

CROSS-REFERENCE TO RELATED APPLICATIONS

This application is a divisional of U.S. patent application Ser. No. 12/019,290, filed Jan. 24, 2008.

FIELD OF THE INVENTION

The present invention relates to telecommunications in general, and, more particularly, to handling calls that involve a wireless terminal that operates with an installed subscriber identity module (SIM).

BACKGROUND OF THE INVENTION

Figure 1:
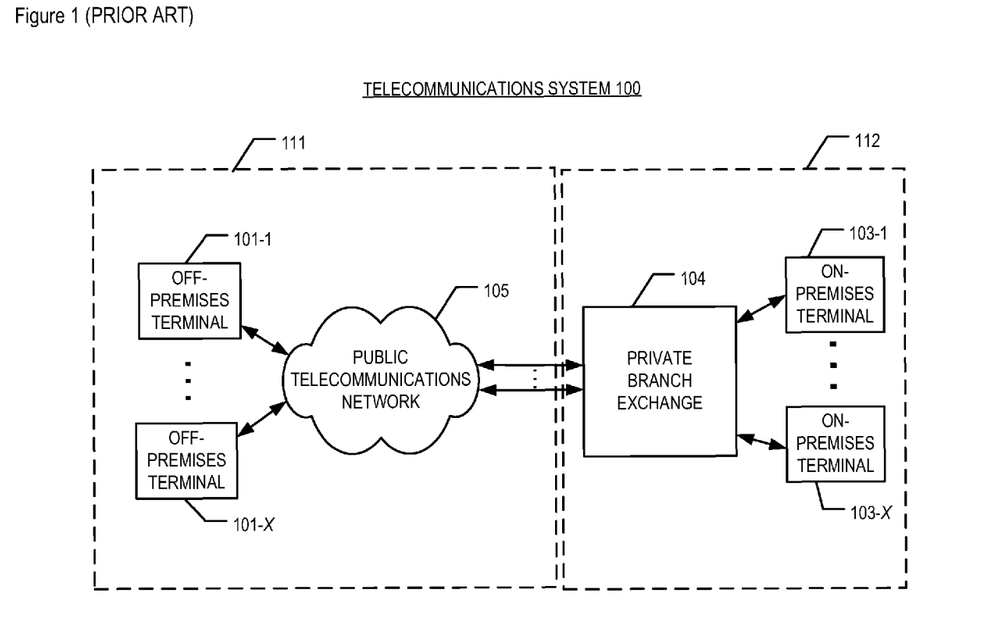
FIG. 1 depicts a block diagram of telecommunications system 100 in the prior art.

FIG. 1 depicts a block diagram of telecommunications system 100 in the prior art. Telecommunications system 100 comprises off-premises telecommunications terminals 101-1 through 101-X, wherein X is a positive integer; on-premises telecommunications terminals 103-1 through 103-X; private branch exchange telephone system 104; and public telecommunications network 105, interconnected as shown.

System 100 is characterized as having two networking regions. Networking region 111 represents the addressable region served by public telecommunications network 105 and comprises the Public Switched Telephone Network (PSTN) or another public network. Networking region 112 represents the addressable region served by private branch exchange 104. As region 112 serves an organization, it is considered to be a "local enterprise network."

In serving its local enterprise network, private branch exchange 104 is capable of switching incoming calls from network 105 (e.g., the Public Switched Telephone Network, etc.) via one or more transmission lines to any of on-premises terminals 103-1 through 103-N. Private branch exchange 104 is also capable of handling outgoing calls from any of on-premises terminals 103-1 through 103-N to network 105 via one or more transmission lines that connect private branch exchange 104 to network 105.

Figure 2:
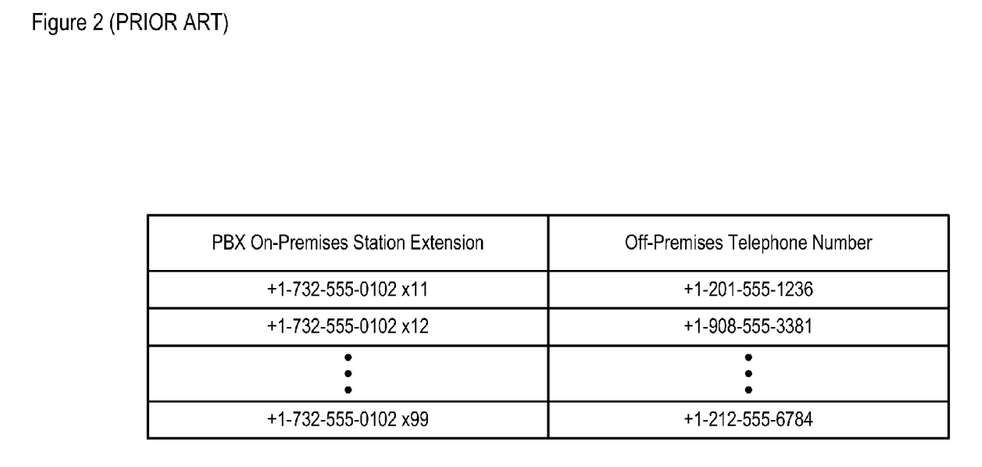
FIG. 2 depicts a table that is used to associate an off-premises terminal's telephone number with the on-premises terminal's station extension, in the prior art.

Private branch exchange 104 is capable of also "extending" an incoming call to a telephone number in network 105, in addition to switching the incoming call to on-premises terminal 103-n, wherein n is an integer between 1 and N, inclusive. The telephone number that is extended-to in telecommunications network 105 corresponds to an off-premises terminal 101-n that is affiliated with a station extension in a database maintained at private branch exchange 104, as depicted by the table in FIG. 2. Off-premises terminal 101-n is typically a wireless terminal, such as a cellular telephone, and does not have to be at a fixed location in networking region 111 when the call is extended to terminal 101-n.

Often, an organization will have private branch exchanges (PBXs) at two or more different worksites and in multiple countries, in order to serve different regions throughout which the organization's members (e.g., employees, etc.) travel. For example, an employee that travels between worksites in the different countries will want to use his cellular telephone while in or near a "visited" local enterprise network, in order to access, through the visited network, the features back in his "home" network with which his cell phone is affiliated. In other words, an employee who is based at the organization's New York branch office might call the New York office's PBX to invoke a feature such as setting up call forwarding, canceling call forwarding, retrieving voice mail, and so forth, even if the employee is currently at his company's worksite in Germany. In order to properly deliver such a call, the call might be routed through the PBX of the worksite he is visiting (e.g., in Germany, etc.).

Routing a call to the private branch exchange of the visited local enterprise network might be advantageous for a number of reasons, such as for the purposes of providing security, reducing toll charges, because of unavailability of a particular private branch exchange (perhaps based in part on the time zones in which the PBXs are located), and so forth.

SUMMARY OF THE INVENTION

The present invention enables an improvement in the ability of an organization's enterprise-wide network to accommodate roaming wireless terminals that are affiliated with the local enterprise networks within the enterprise-wide network. In particular, the illustrative-embodiment system is capable of handling a wireless terminal such as a cellular telephone that is able to use different subscriber identity module cards, or "SIM" cards, in different geographic regions or service-provider networks. In some techniques in the prior art, installing a new SIM card can pose a problem, in that subscriber-specific information stored on the SIM card can change from one installed card to the next, thereby making it difficult to track the wireless terminal throughout the network. The illustrative-embodiment system provides a solution to the problem of using different SIM cards.

In accordance with the illustrative embodiment, a mobility client that is part of the wireless terminal registers with a coordinating server that supports the enterprise-wide network. Specifically, the mobility client registers when it detects that a new SIM card has been installed at the wireless terminal, whereby the client provides the subscriber-specific information that the wireless terminal reads from the SIM card. The mobility client identifies itself to the server by a user identifier that is unique within the enterprise-wide network, such as the station extension with which the terminal is affiliated back at the home local enterprise network. Upon successful registration, the client receives an access number that is suitable for its current location.

Later, when a call is originated at the wireless terminal, the mobility client begins a call by calling the access number that it had received and by sending the remaining digits in-band when the originated call has been completed to the access number. The access-number call is routed to the coordinating server, which reroutes the call to the home local enterprise network with the calling number set to the home telephone number of the wireless terminal, so that the calling party is recognizable by the called party.

Additionally, when the server receives, from the home local enterprise network, an incoming call that is to be extended to the wireless terminal, it routes the call to the gateway system that is closest to the last registered location of the wireless terminal—that is, the location that corresponds to the subscriber-specific information provided by the mobility client in the registration message.

In accordance with the illustrative embodiment of the present invention, a method for notifying an enterprise-wide network that one or more parameter values have changed at a wireless terminal operating within the enterprise-wide network comprises: receiving, at a client portion of the wireless terminal, subscriber-specific information from a removable subscriber information module, the receiving being based on the subscriber information module having been installed at the wireless terminal, and the subscriber-specific information comprising values of a mobile carrier code, a mobile network code, and a mobile subscriber identification number; detecting that at least one of the values of the mobile carrier code, mobile network code, and mobile subscriber identification number has changed with respect to any previous value stored thereof at the client portion; and transmitting, from the wireless terminal to a coordinating data-processing system within the enterprise-wide network, a registration message that comprises a user identifier and the subscriber-specific information, the user identifier i) being known to the client portion and ii) being unique within the address space of the enterprise-wide network.

DETAILED DESCRIPTION

The following term is defined for use in this Specification, including the appended claims:

The term "subscriber identity module (SIM)," and its inflected forms, is defined as a portable memory chip that is used in some models of cellular telephones or other wireless terminals. The subscriber identity module, or "SIM card," makes it easier to switch to a new terminal by removing the SIM from the old phone and inserting it into the new one. Alternatively, the SIM enables the use of the same wireless terminal in different networks because the subscriber-specific information is stored on the SIM itself. The subscriber-specific information comprises a mobile carrier code (MCC), a mobile network code (MNC), and a mobile subscriber identification number (MSIN); together, these three parameters are sometimes referred to in the art as an International Mobile Subscriber Identity, or "IMSI." Additionally, the SIM can store a phone book, text messages, and other data.

The term "Subscriber Identity Module," and its inflected forms, also refers to equivalent devices such as, but not limited to, a Universal Subscriber Identity Module (USIM), a Removable User Identity Module (R-UIM), and a CDMA Subscriber Identity Module (CSIM).

Figure 3:
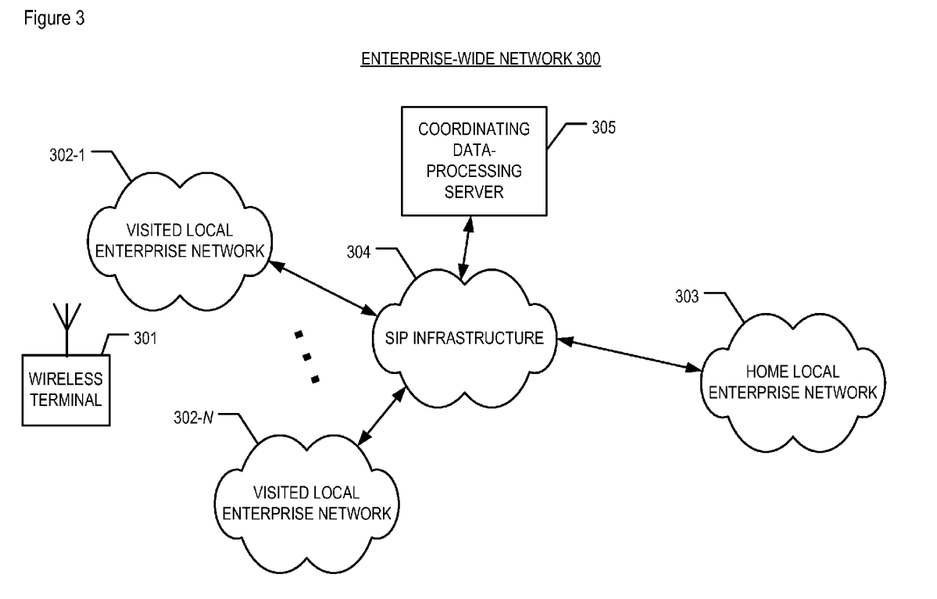
FIG. 3 depicts a block diagram of enterprise-wide network 300, in accordance with an illustrative embodiment of the present invention.

FIG. 3 depicts a block diagram of enterprise-wide network 300, in accordance with an illustrative embodiment of the present invention. Network 300 serves off-premises wireless telecommunications terminal 301 (as well as other terminals) and comprises visited local enterprise networks 302-1 through 302-N, wherein N is a positive integer; home local enterprise network 303; Session Initiation Protocol (SIP) infrastructure 304; and coordinating data-processing server 305. The devices in network 300 are interconnected as shown.

Off-premises wireless terminal 301 is a wireless telecommunications terminal such as a cellular telephone, which is affiliated with one of the on-premises terminals within home enterprise network 303 and, as such, is also affiliated with a station extension for which there is an enterprise-wide numbering plan. In accordance with the illustrative embodiment, wireless telecommunications terminal 301 comprises a mobility client portion; additionally, a removable subscriber identity module can be installed at the terminal. Wireless terminal 301 is described in additional detail with respect to FIG. 4 and is capable of performing the tasks with respect to FIG. 7.

Visited local enterprise network 302-*n*, wherein n has a value between 1 and N, comprises network switching and routing equipment, as well as transmission and access infrastructure. Network 302-*n* provides access to off-premises wireless terminals that are presently roaming within or nearest to network 302-*n*. When terminal 301 is not actually within network 302-*n*, but is near the network, terminal 301 accesses network 302-*n* (and vice-versa) via the local public network (e.g., PSTN, etc.) in that area. For example, as reflected in FIG. 3, terminal 301 is closest to network 302-1; it can be said that the terminal currently "visiting" network 302-1 and, as a result, network 302-1 is serving the terminal. As network 302-*n* comprises a private branch exchange or equivalent telecommunications equipment, the network provides access to all of the functionality of private branch exchange 104 of the prior art.

Home local enterprise network 303 comprises network switching and routing equipment, as well as transmission and access infrastructure. Network 303 provides access to affiliated, off-premises wireless terminals that are presently within or nearest to their home coverage area. When an off-premises terminal is not actually within network 303, but is near the network, the terminal accesses network 303 (and vice-versa) via the local public network (e.g., PSTN, etc.) in that area.

As network 303 comprises a private branch exchange, the network provides access to all of the functionality of private branch exchange 104 of the prior art. Additionally, network 303 will receive originated calls that are routed, in well-known fashion, from wireless terminal 301 via SIP infrastructure 304 and will extend incoming calls, in well-known fashion, out to wireless terminal 301 via SIP infrastructure 304 and visited enterprise network 302-1.

The nomenclature of "visited" local enterprise network 302-*n* and of "home" local enterprise network 303, as used in FIG. 3, are relative to wireless terminal 301. That is, a "visited" local enterprise network is any local enterprise network where terminal 301 is not considered to be home, in contrast to the "home" local enterprise network. As those who are skilled in the art will appreciate, another off-premises wireless terminal might consider one of the so-called visited networks to be its "home" enterprise network, in which case the so-called home network 303 would instead be considered another visited network, relative to that other terminal.

Coordinating data-processing server 305 is a centralized, database server that stores details of each off-premises terminal that is authorized to use enterprise-wide network 300. Server 305 is capable of updating and storing the current locations of all off-premises terminals, such as terminal 301, throughout enterprise-wide network 300. The salient components of server 305 are described in additional detail below and with respect to FIG. 5. Additionally, server 305 comprises a coordinating routing engine, which uses a database to support the tasks of the illustrative embodiment, the tables of which are depicted in FIG. 6. The manner in which server 305 performs its functions in accordance with the illustrative embodiment is described below and with respect to FIGS. 8 through 11.

As will be appreciated by those skilled in the art, in some alternative embodiments of the present invention, the coordinating and routing performed by server 305 might be performed by a data-processing system other than a centralized server, such as a private branch exchange in one of the depicted enterprise networks. It will be clear to those skilled in the art, after reading this specification, how to make and use such embodiments.

Figure 4:
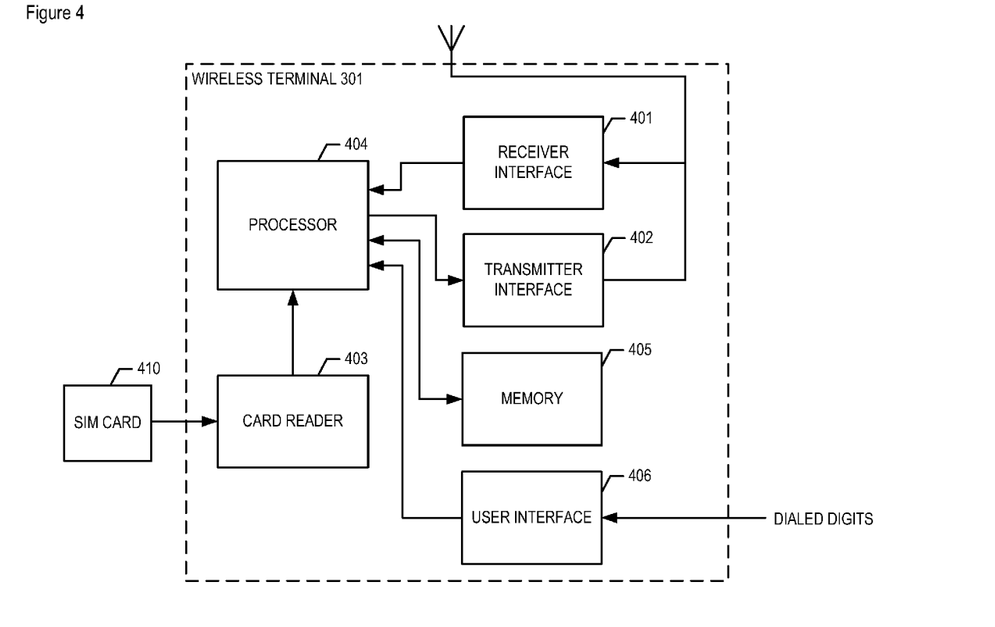
FIG. 4 depicts a block diagram of the salient components of wireless terminal 301, in accordance with an illustrative embodiment of the present invention.

FIG. 4 is a block diagram of the salient components of wireless terminal 301 in accordance with the illustrative embodiment of the present invention, which components are interconnected as shown. In accordance with the illustrative embodiment, terminal 301 comprises:

i. receiver interface 401,
  ii. transmitter interface 402,
  iii. card reader 403,
  iv. processor 404,
  v. memory 405, and
  vi. user interface 406.

It will be clear to those skilled in the art, after reading this disclosure, how to make and use alternative embodiments of the present invention in which wireless terminal 301 comprises any subcombination of the components listed above.

Receiver interface 401 and transmitter interface 402 comprise the circuitry that enables terminal 301 to respectively receive signals from and transmit signals to a local enterprise network (i.e., network 302-*n*, network 303), in well-known fashion. Together, receiver interface 401 and transmitter interface 402 are sometimes referred to as a "transceiver."

Card reader 403 is a device that is able to read SIM card 410 when the card is installed (e.g., inserted into a slot, etc.), in well-known fashion.

Processor 404 is a general-purpose processor that is capable of receiving information from receive interface 401, of exchanging information with SIM card 410 via card reader 403, of executing instructions stored in memory 405, of reading data from and writing data into memory 405, and of transmitting information to transmit interface 402. In some alternative embodiments of the present invention, processor 404 might be a special-purpose processor.

Memory 405 stores the instructions and data used by processor 404, in well-known fashion. In accordance with the illustrative embodiment, memory 405 stores the station extension with which wireless terminal 301 is affiliated within enterprise-wide network 300. This station extension, or whatever user identifier is used, was previously provisioned to terminal 301, such as when terminal 301 was configured to serve as an off-premises terminal relative to a particular home private branch exchange. Memory 405 can be any combination of dynamic random-access memory (RAM), flash memory, disk drive memory, and so forth.

User interface 406 comprises a keypad or some other component that enables a user of terminal 301 to enter dialed digits.

Figure 5:
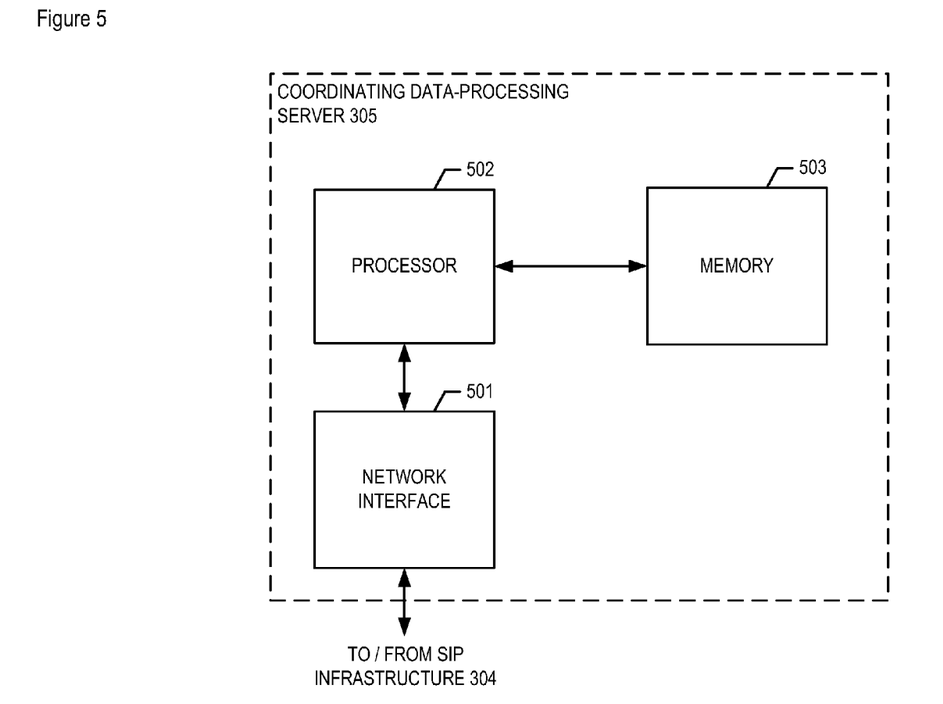
FIG. 5 depicts a block diagram of the salient components of coordinating data-processing server 305, in accordance with an illustrative embodiment of the present invention.
Figure 6:
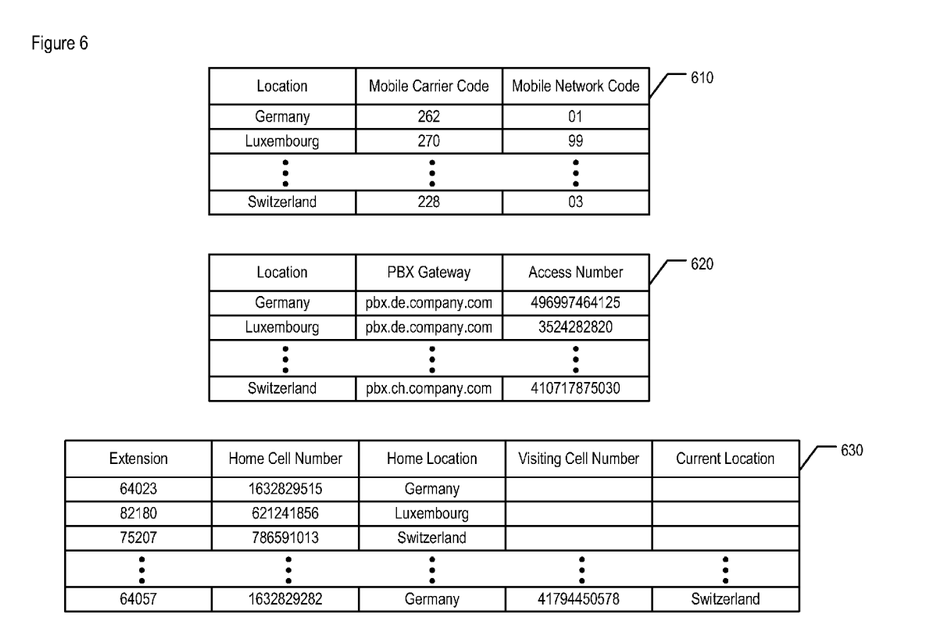
FIG. 6 depicts tables 610, 620, and 630 that are used by server 305 to properly handle calls from terminals with installed subscriber identity modules.

FIG. 5 is a block diagram of the salient components of coordinating data-processing server 305 in accordance with the illustrative embodiment of the present invention, which components are interconnected as shown. In accordance with the illustrative embodiment, server 305 comprises:

i. network interface 501,
  ii. processor 502, and
  iii. memory 503.

It will be clear to those skilled in the art, after reading this disclosure, how to make and use alternative embodiments of the present invention in which server 305 comprises any subcombination of the components listed above.

Network interface 501 comprise the circuitry that enables server 305 to receive signals from and transmit signals to any off-premises terminal such as terminal 301 and any local enterprise network (302-*n*, 303), via SIP infrastructure 304 in well-known fashion.

Processor 502 is a general-purpose processor that is capable of receiving information from and transmitting information to network interface 501, of executing instructions stored in memory 503, and of reading data from and writing data into memory 503. In some alternative embodiments of the present invention, processor 502 might be a special-purpose processor.

Memory 503 stores the instructions and data used by processor 502, in well-known fashion. In particular, memory 503 stores the database information that is depicted in FIG. 6 and as described below. Memory 405 can be any combination of dynamic random-access memory (RAM), flash memory, disk drive memory, and so forth.

FIG. 6 depicts the database information used by server 305 to support off-premises wireless terminals such as terminal 301, in accordance with the illustrative embodiment of the present invention. The depicted database information is in the form of three tables, namely tables 610, 620, and 630. As those who are skilled in the art will appreciate, in some alternative embodiments, the database information can be represented in a different format than that depicted.

Table 610 is a client mobility table that associates the combination of the mobile carrier code (MCC) and the mobile network code (MNC) with a location string. For example, the combination of an MCC value of "262" and an MNC value of "01" corresponds to an enterprise organization's local enterprise network in Germany, whereas the combination of an MCC value of "228" and an MNC value of "03" corresponds to the organization's local enterprise network in Switzerland.

Table 620 is a local gateway location table that associates each location (by location string) with i) the SIP address of the local gateway system (e.g., private branch exchange, etc.) at that location and ii) the applicable access number.

Table 630 is user table that associates the user's user identity—in this case, the station extension—with the user's wireless terminal number. For pedagogical purposes, wireless terminal 301 corresponds to the information depicted on the bottommost row of the table. Accordingly, wireless terminal 301 has a user identifier of "64057", a home cell phone number of "1632829282", a home location of "Germany", a visiting cell phone number of "41794450578", and a current location of "Switzerland". Put in terms of the local enterprise networks depicted in FIG. 3, the organization's Germany location corresponds to home local enterprise network 303, and the organization's Switzerland location corresponds to visited location enterprise network 302-1. The visiting cell number is part of the subscriber-specific information obtained from SIM card 410.

Figure 7:
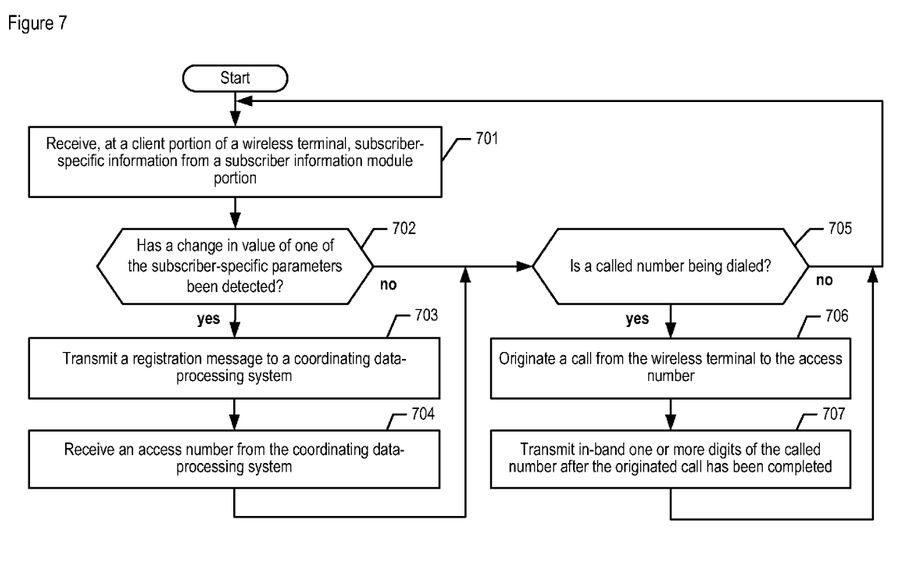
FIG. 7 depicts a flowchart of the salient tasks of affiliated telecommunications terminal 301, in accordance with the illustrative embodiment of the present invention.

FIG. 7 depicts a flowchart of the salient tasks performed by wireless terminal 301, in accordance with the illustrative embodiment of the present invention. Terminal 301 performs the described tasks, in order to notify coordinating data-processing server 305 that one or more parameter values have changed at the terminal. For example, terminal 301 performs these tasks whenever subscriber identity module (SIM) 410 is installed at the terminal. Although the tasks feature terminal 301, other off-premises terminals can perform the tasks as described. It will be clear to those skilled in the art which tasks depicted in FIG. 7 can be performed simultaneously or in a different order than that depicted.

At task 701, terminal 301 receives, at its mobility client portion which is physically distinct from SIM 410, subscriber-specific information from SIM 410. The receiving of the information is based on SIM 410 having been installed at terminal 410, such as when SIM 410 is inserted into card reader 403. In some embodiments, the subscriber-specific information comprises values of one or more of a mobile carrier code, a mobile network code, and a mobile subscriber identification number, as are known in the art. As those who are skilled in the art will appreciate, other equivalent parameters can constitute the subscriber-specific information.

At task 702, terminal 301 detects that at least one of the values of the mobile carrier code, mobile network code, and mobile subscriber information number has changed with respect to any previous value stored of those parameters at the mobility client portion of terminal 301. For example, terminal 301 previously might have had another subscriber identity module other than SIM 410 installed, in which case other parameters would have been read and stored by the mobility client. Alternatively, terminal 301 might not have had any subscriber identity module previously installed, in which case the values read from SIM 410 are, in essence, different from whatever data had been present in memory.

If a change in value has been detected, task execution proceeds to task 403; otherwise, task execution proceeds to task 705.

At task 703, terminal 301 transmits a registration message to coordinating data-processing server 305. The registration message comprises a user identifier and some or all of the subscriber-specific information. In accordance with the illustrative embodiment, the user identifier is the station extension that had been previously stored at terminal 301 and is unique within the address space (i.e., the addressable region of telephone service) of enterprise-wide network 300. In some alternative embodiments, the user identifier is another parameter whose values are administered on an enterprise-wide basis. Additionally, the user identifier is known to only the mobility client portion of terminal 301. In other words, it is unknown to SIM 410.

At task 704, terminal 301 receives an access number from coordinating data-processing server 305, in response to the transmission of the registration message at task 703. The access number is based on the subscriber-specific information. The access number corresponds to the local gateway system (e.g., a private branch exchange, etc.) that terminal 301 can use, in order to access network 300 for the purpose of making calls.

At task 705, terminal 301 detects that a called number is being dialed by its user (e.g., via user interface 406, etc.). If a called number is being dialed, task execution proceeds to task 706. Otherwise, task execution proceeds back to task 701.

At task 706 and based on the detection at task 705, terminal 301 originates a call to the access number current stored, such as the access number received at task 704.

At task 707, terminal 301 transmits in-band one or more digits of the called number after the originated call to the access number has been completed. Task execution then proceeds back to task 701.

Figure 8:
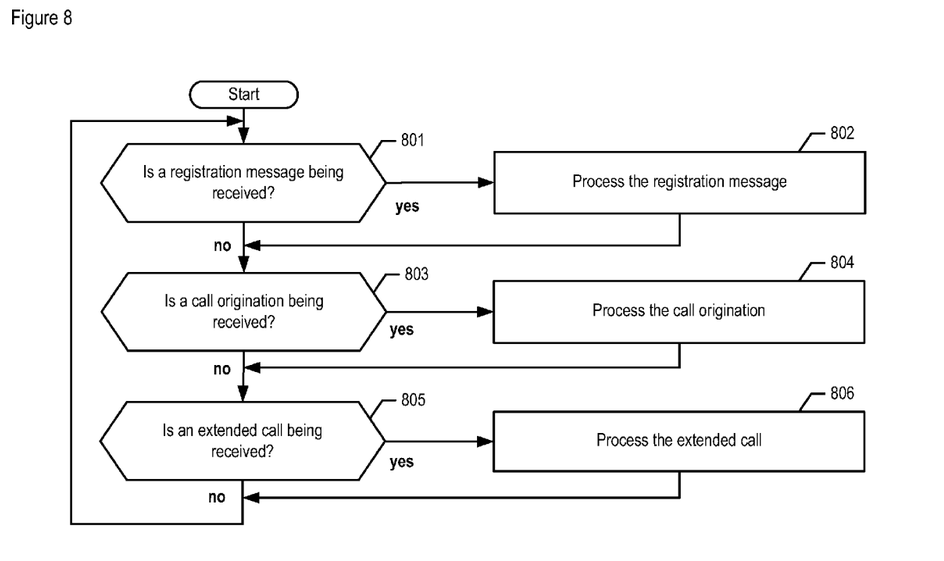
FIG. 8 depicts a flowchart of the salient tasks of server 305, in accordance with the illustrative embodiment of the present invention.

FIG. 8 depicts a flowchart of the salient tasks performed by coordinating data-processing server 305, in accordance with the illustrative embodiment of the present invention. Server 305 performs the described tasks, in order to process one or more messages received from an off-premises terminal. Although the tasks feature receiving messages from terminal 301, server 305 is able to handle other off-premises terminals concurrently by performing the described tasks on messages from the other terminals. It will be clear to those skilled in the art which tasks depicted in FIG. 8 can be performed simultaneously or in a different order than that depicted.

At task 801, server 305 checks if a registration-related message is being received. If so, task execution proceeds to task 802. Otherwise, task execution proceeds to task 803.

At task 802, server 305 processes the registration message. Task 802 is described with respect to FIG. 9.

At task 803, server 305 checks if a call origination is being received. If so, task execution proceeds to task 804. Otherwise, task execution proceeds to task 805.

At task 804, server 305 processes the call origination. Task 804 is described with respect to FIG. 10.

At task 805, server 305 checks if an extended call is being received from home local enterprise network 303. If so, task execution proceeds to task 806. Otherwise, task execution proceeds back to task 801.

At task 806, server 305 processes the extended call. Task 806 is described with respect to FIG. 11. Task execution then proceeds back to task 801.

Figure 9:
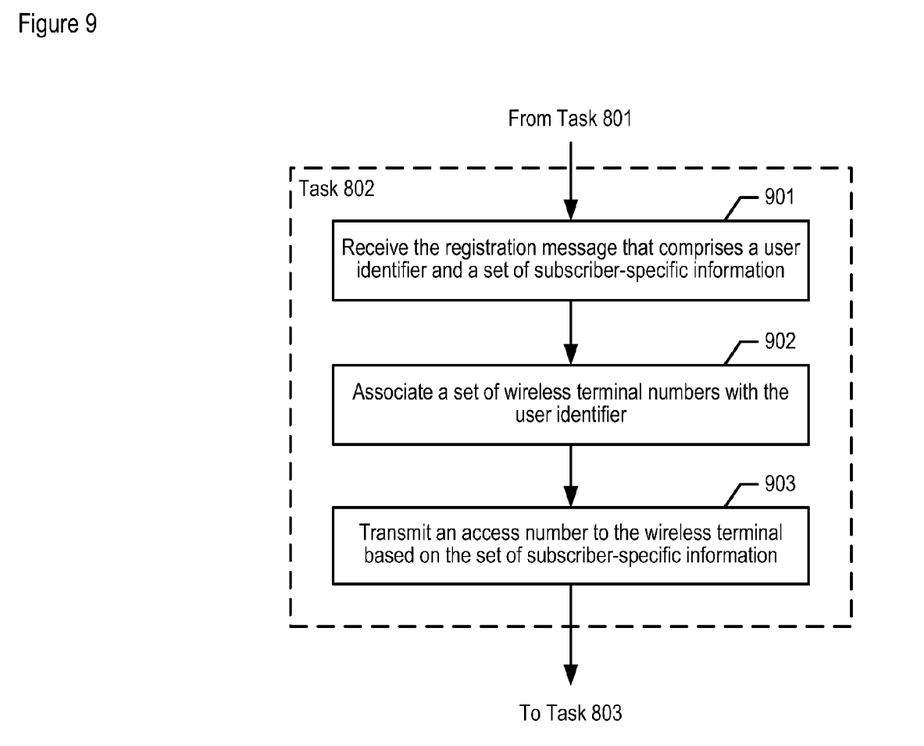
FIG. 9 depicts a flowchart of the salient tasks for processing a received registration message at server 305.

FIG. 9 depicts a flowchart of the salient tasks performed by coordinating data-processing server 305, in order to process a registration message being received. It will be clear to those skilled in the art which tasks depicted in FIG. 9 can be performed simultaneously or in a different order than that depicted.

At task 901, server 305 receives the registration message from terminal 301. The registration message comprises the user identifier and the subscriber-specific information as described above and with respect to task 703.

At task 902, server 305 associates in its database, a set of one or more wireless terminal numbers with the user identifier received at task 901. The set of wireless terminal numbers comprises the mobile subscriber identification number.

Additionally, server 305 associates in its database, the current location of terminal 301 with the received user identifier. The current location is based on the registration message receiver at task 901. For example, the current location can be based on the received mobile carrier code and mobile network code. Referring to table 630, for example, terminal 301's current location of "Switzerland" can be based on the unique combination of mobile carrier code and mobile network code values of "228" and "03", respectively (from table 610).

At task 903, server 305 transmits the access number of task 704 to terminal 301. The access number is based on the set of subscriber-specific information received at task 901 and associated at task 902. According to table 620, the access number of the nearest enterprise network of the current location of "Switzerland" is "410717875030". In some embodiments, server 305 transmits the access number only if the current location has changed.

Figure 10:
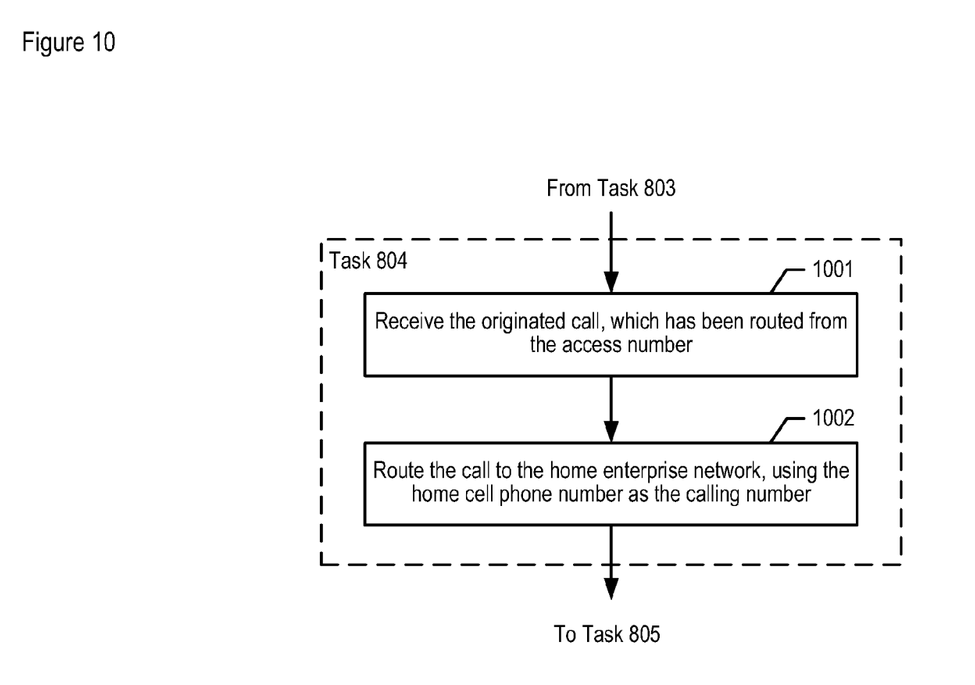
FIG. 10 depicts a flowchart of the salient tasks for processing a received originated call at server 305.

FIG. 10 depicts a flowchart of the salient tasks performed by coordinating data-processing server 305, in order to process a call that is originated by terminal 301. It will be clear to those skilled in the art which tasks depicted in FIG. 10 can be performed simultaneously or in a different order than that depicted.

At task 1001, server 305 receives the originated call, which has been routed from the gateway system that corresponds to the access number received by the terminal at task 704.

At task 1002, server 305 routes the call to home local enterprise network 303. In accordance with the illustrative embodiment, server 305 sets the calling number to the home cell phone number (i.e., "1632829282" from table 630).

Figure 11:
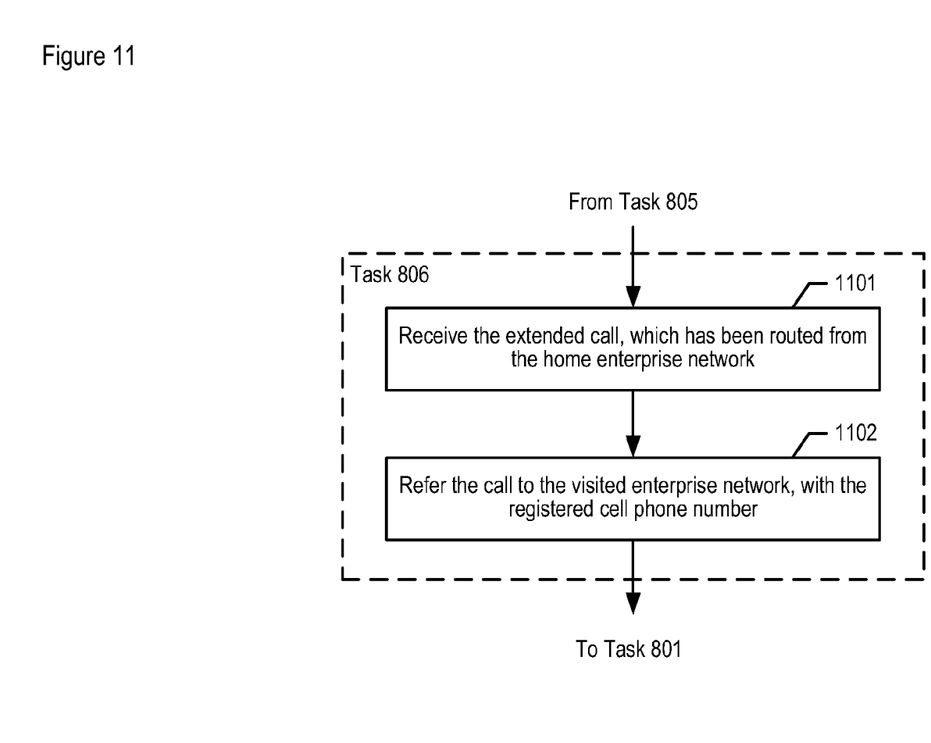
FIG. 11 depicts a flowchart of the salient tasks for processing a received redirected call at server 305.

FIG. 11 depicts a flowchart of the salient tasks performed by coordinating data-processing server 305, in order to process a call that is being extended to terminal 301 from home local enterprise network 303. It will be clear to those skilled in the art which tasks depicted in FIG. 11 can be performed simultaneously or in a different order than that depicted.

At task 1101, server 305 receives the extended call, which has been routed from terminal 301's home PBX (at home enterprise network 303).

At task 1102, server 305 refers the call to the gateway system in the visited local enterprise network, which nearest to the "Switzerland" location. In table 620, the address of the gateway system in that network is "pbx.ch.company.com"

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for handling one or more messages received from a wireless terminal associated with an enterprise-wide network that comprises, with respect to the wireless terminal, a home enterprise network and at least a first visited enterprise network, the method comprising:

receiving, at a coordinating data-processing system that is within the enterprise-wide network, a first registration message from the wireless terminal, the first registration message comprising i) a user identifier that is unique within the address space of the enterprise-wide network, and ii) a first set of subscriber-specific information that comprises values of a mobile carrier code, a mobile network code, and a mobile subscriber identification number;

associating, in a database at the coordinating data-processing system, i) a first set of one or more wireless terminal numbers with the user identifier, the first set of one or more wireless terminal numbers comprising the mobile subscriber identification number, and ii) a first current location of the wireless terminal with the user identifier, the first current location being based on the first registration message; and transmitting a first access number from the coordinating data-processing system to the wireless terminal, the first access number being based on the first set of subscriber-specific information received from the wireless terminal and being associated with the first visited enterprise network.

2. The method of claim 1 further comprising:

receiving, at the coordinating data-processing system, a second registration message from the wireless terminal, the second registration message comprising i) the user identifier, and ii) a second set of subscriber-specific information that is different from the first set of subscriber-specific information;

associating, in the database, i) a second set of one or more wireless terminal numbers with the user identifier, and ii) a second current location of the wireless terminal with the user identifier, the second current location of the wireless terminal being based on the second registration message; and transmitting a second access number from the coordinating data-processing system to the wireless terminal, the second access number being based on the second set of subscriber-specific information received from the wireless terminal and being associated with a second visited enterprise network.

3. The method of claim 2 further comprising detecting that at least one of the values of the mobile carrier code, mobile network code, and mobile subscriber identification number that constitute the second set of subscriber-specific information has changed with respect to any previous value stored thereof at the coordinating data-processing system with respect to the wireless terminal;

wherein the transmission of the second access number is also based on the detection.

4. The method of claim 2 wherein each of the first and second sets of one or more wireless terminal numbers comprises a home wireless terminal number that is based on the home enterprise network.

5. The method of claim 4 further comprising:

receiving a call that is originated by the wireless terminal to the second access number, along with dialed digits of a called number; and specifying that the home wireless terminal number is to be represented to the called number as the calling number of the call.

6. The method of claim 4 wherein the user identifier comprises a station extension that has been previously associated with the home wireless terminal number, and wherein the station extension is based on an enterprise-wide numbering plan for the enterprise-wide network.

7. The method of claim 2 further comprising receiving, at the coordinating data-processing system, a call to the wireless terminal from the home enterprise network; and referring the call to the first visited enterprise network whenever the first current location is associated with the user identifier; and referring the call to the second visited enterprise network whenever the second current location is associated with the user identifier.

\* \* \* \* \*